United States Patent
D'Souza

(10) Patent No.: US 6,371,343 B1
(45) Date of Patent: Apr. 16, 2002

(54) REMOVABLE TIE DOWN BRACE FOR VEHICLE

(76) Inventor: Desmond D'Souza, 803 Bellmore Ave., E. Meadow, NY (US) 11554

( * ) Notice: Subject to any disclaimer, the term of this patent is extended or adjusted under 35 U.S.C. 154(b) by 0 days.

(21) Appl. No.: 09/667,780

(22) Filed: Sep. 22, 2000

(51) Int. Cl.[7] .................................................. B60R 9/00
(52) U.S. Cl. ...................................... 224/324; 224/572
(58) Field of Search ................................. 224/309, 321, 224/322, 323, 324, 572

(56) References Cited

U.S. PATENT DOCUMENTS

| | | | |
|---|---|---|---|
| 2,009,721 A | | 6/1935 | Williams |
| 2,315,387 A | * | 3/1943 | Bambenek et al. ..... 224/324 X |
| 2,434,387 A | | 1/1948 | Brandt |
| 2,434,826 A | * | 1/1948 | Wubben ................. 224/324 X |
| 2,714,480 A | | 8/1955 | Harris |
| 2,721,681 A | | 10/1955 | Daniels |
| 2,782,973 A | * | 2/1957 | Lang ....................... 224/324 X |
| 2,888,178 A | * | 5/1959 | Olson ...................... 224/324 X |
| 3,001,679 A | * | 9/1961 | Canning et al. ........ 224/324 X |
| 3,606,230 A | | 9/1971 | Hargreaves |
| 3,776,437 A | | 12/1973 | Carney |
| 3,836,058 A | * | 9/1974 | Penniman et al. ...... 224/324 X |
| 3,960,301 A | * | 6/1976 | Miller ..................... 224/324 X |
| 4,084,735 A | * | 4/1978 | Kappas ................... 224/324 X |
| 4,460,117 A | | 7/1984 | Smalls |
| 4,655,376 A | | 4/1987 | Darling |
| 4,940,175 A | | 7/1990 | Tittle |
| 5,358,162 A | * | 10/1994 | Hill ............................. 224/316 |
| 5,381,939 A | * | 1/1995 | Tippets ................... 224/309 X |
| 5,641,106 A | * | 6/1997 | Slaughter et al. ........... 224/324 |
| 5,947,354 A | * | 9/1999 | Williams .................... 224/318 |

\* cited by examiner

Primary Examiner—Stephen K. Cronin
(74) Attorney, Agent, or Firm—Chandrakant C. Shroff; Papan Devnani, Esq.

(57) ABSTRACT

A removable tie down brace for a vehicle is disclosed. The brace consists of at least one L-shaped member that is disposed transversely across the roof or cab of the vehicle, resting on hard rubber legs or feet. Two sets of apertures extend through both of the planar surfaces described by the "L" perpendicular to one another, thus allowing the user to secure a wide variety of objects of all sizes and shapes. Various utility attachment means are provided to allow the user to position bungee cords, rope, or the like, in various ways.

23 Claims, 9 Drawing Sheets

REMOVABLE TIE DOWN BRACE FOR VEHICLE

BACKGROUND OF THE INVENTION

1. Field of the Invention

The present invention relates generally to restraining devices for objects. More specifically, it relates to a restraining device or brace that is removably attached to a vehicle. Even more specifically, it relates to a removable tie-down device that may be temporarily fixed to the roof of an automobile, SUV, or the like, to allow the user to tie down or restrain a wide variety of objects. Even more specifically, the invention relates to a generally rigid, L shaped bracket that has a plurality of apertures through both planar surfaces described by the L. Additionally, at the each end of the bracket, there is a section that is specially strengthened and that includes attachment means for a strap that passes transversely through the passenger cabin of the vehicle. The bracket rests on frusto-conical hard rubber legs that prevent the bracket material from scratching the paint of the vehicle. The multiple apertures allow for many different types and shapes of objects to be secured.

2. Description of the Prior Art

Very often, the owner or user of an automobile or the like desires to move some object that is too large to fit into the cabin of the car. Mattresses, for example, are notoriously difficult to transport in anything short of a large SUV or a pickup truck. Even with one of these vehicles, if a large amount of material needs to be moved at once, it can be impossible to fit certain very large or very bulky objects in either the cab of the SUV or the bed of the pickup. It is therefore helpful to have some way of securing various objects onto the top of the vehicle cab. The present invention seeks to address this problem by providing a novel removable bracket or brace that will accommodate a broad variety of objects. The user attaches one or more of the novel brackets by resting it on the detachable frusto-conical legs. A strap is attached to the device at the appropriate point on each of the ends of the bracket and is passed transversely through the passenger cabin. An adjustable buckle or winch is provided attached to the strap to tighten it until the brace (or each brace if more than one is used) is secure on the roof or cab of the vehicle. A variety of securing attachments is provided with the device that, with the addition of elastic (or bungee) cords, an almost infinite variety of various materials may be secured to the vehicle.

During a search at the U.S. Patent and Trademark Office, a number of relevant patents were uncovered and they will be discussed below.

First is U.S. Pat. No. 2,009,721 issued to Percy Q. Williams on Jul. 30, 1935. This is a vacuum cup luggage carrier where the rack for carrying the articles is disposed on a base made up of suction cups. This is clearly dissimilar from the present invention in that there is no transverse strap disposed within the passenger compartment of the vehicle.

Next is U.S. Pat. No. 2,434,387 issued to Edison R. Brandt on Jan. 14, 1948. This is an article carrier that attaches with a toggle fastener that engages the gutter of the car top. As in the Williams patent above, and unlike the present invention, there is no teaching of the transverse strap extending into the passenger compartment of the vehicle.

Another patent of interest is U.S. Pat. No. 2,714,480 issued on Aug. 2, 1955 to George R. Harris. This describes a luggage carrier where a flat tray is secured to the roof of the vehicle with both brackets and suction cups. This is clearly unlike the instant invention, which is made up of at least one of the L-shaped brackets that include a plurality of apertures through both of the L's faces.

In U.S. Pat. No. 2,721,681 issued on Oct. 25, 1955 to Thomas Daniel there is disclosed a combination luggage carrier and picnic table. This is secured on the vehicle roof with transverse supports that include rubber suction cups. As in the above-mentioned patents, there is no teaching of the plurality of perpendicularly disposed apertures on the length of the bracket(s).

U.S. Pat. No. 3,606,230 issued on Sep. 20, 1971 to George M. Hargreaves discloses a cartop load supporting device. This does disclose a line extending transversely through the vehicle body, but does not have the apertures and brackets required by the instant invention that allow it to support a wide variety of variously shaped and sized items.

In U.S. Pat. No. 3,776,437 issued to William M. Carney on Dec. 4, 1973 there is disclosed a water ski stowing device. This includes at least one elongate member that carries a plurality of bifurcate elements that are adapted to engage with water skis. Unlike the present invention, there is no teaching of the adjustable strap that secures the bracket to the roof of the vehicle.

Next is U.S. Pat. No. 4,655,376 issued to Gilbert R. Darling on Apr. 7, 1987. This is a tie-down device and method wherein a braided rope is looped around a rack and is attached by a telescopic twisting handle. This is clearly dissimilar from the present invention.

U.S. Pat. No. 4,460,117 issued to Joe C. Smalls et al. on Jul. 17, 1984 there is disclosed a fishing pole holder for vehicles. This includes a strap for fastening the rack to the car, however there is no teaching of the L-shaped bracket with its plurality of perpendicular apertures on the separate faces.

Lastly, U.S. Pat. No. 4,940,175 issued on Jul. 10, 1990 to Eberhard Tittel discloses a car-top carrier where the supporting elements that hold the transversely disposed carrier are held in place by locking screws to the rail on the top of the car.

Thus, while the foregoing overview of prior art indicates it to be well known to use various types of devices as luggage or material carriers on the roofs of vehicles, none of these patents disclose the unique elements that make up the instant invention. The L-shaped bracket of the present invention, with its with perpendicularly disposed apertures is not seen in any of the art of record. This combination allows the user to conveniently brace and otherwise secure a wider variety of devices and material than has heretofore been possible. With the addition of the various other utility attachments and elastic cords of the invention, almost any type of furniture, packages, luggage, or the like may be secured in combination with one another, all without scarring or damaging the roof of the vehicle.

SUMMARY OF THE INVENTION

To achieve the foregoing and other advantages, the present invention, briefly described, provides a removable tie-down brace for a vehicle where at least one L-shaped brace rests on a plurality of frusto-conical hard rubber rests. On each distal end of the bracket, a strap engagement means is provided to attach ribbon-like pieces of material that extend transversely through the interior of the vehicle. These are connected one to the other by either an adjustable buckle or winch type of apparatus that allows the user to tighten the bracket securely to the roof or cab of the vehicle. Additionally, a plurality of utility attachments and elastic cords are provided that allow a large variety of objects to be temporarily held in proximity to the vehicle.

Thus it is a principal object of the invention to provide a removable tie down brace for a vehicle that overcomes the disadvantages of the prior art.

It is a further object of the invention to provide a removable tie down brace for a vehicle that allows the user to securely attach a wider variety of objects than has heretofore been possible.

Still yet a further object of the invention is to provide a removable tie down brace for a vehicle wherein the primary bracket is L-shaped in cross section and on each of the faces is a plurality of apertures extending along its length such that the two sets of apertures are disposed perpendicularly to one another.

Yet another object of the invention is to provide a removable tie down brace for a vehicle wherein each distal end of the L-shaped bracket is provided with a strap engagement means that allows a strap that has either an adjustable buckle or winch type device to be extended transversely through the cab or passenger cabin of the vehicle Still yet another object of the invention is to provide a removable tie down brace for a vehicle wherein a plurality of utility attachments are provided that, in combination with elastic cords, almost any type of object, no matter how awkwardly shaped, may be attached to the roof or cab of the vehicle.

Yet another object of the invention is to provide a removable tie down brace for a vehicle wherein the L-shaped brace itself may be used to prevent unintended movement of the object being secured.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENTS

Figure 1:
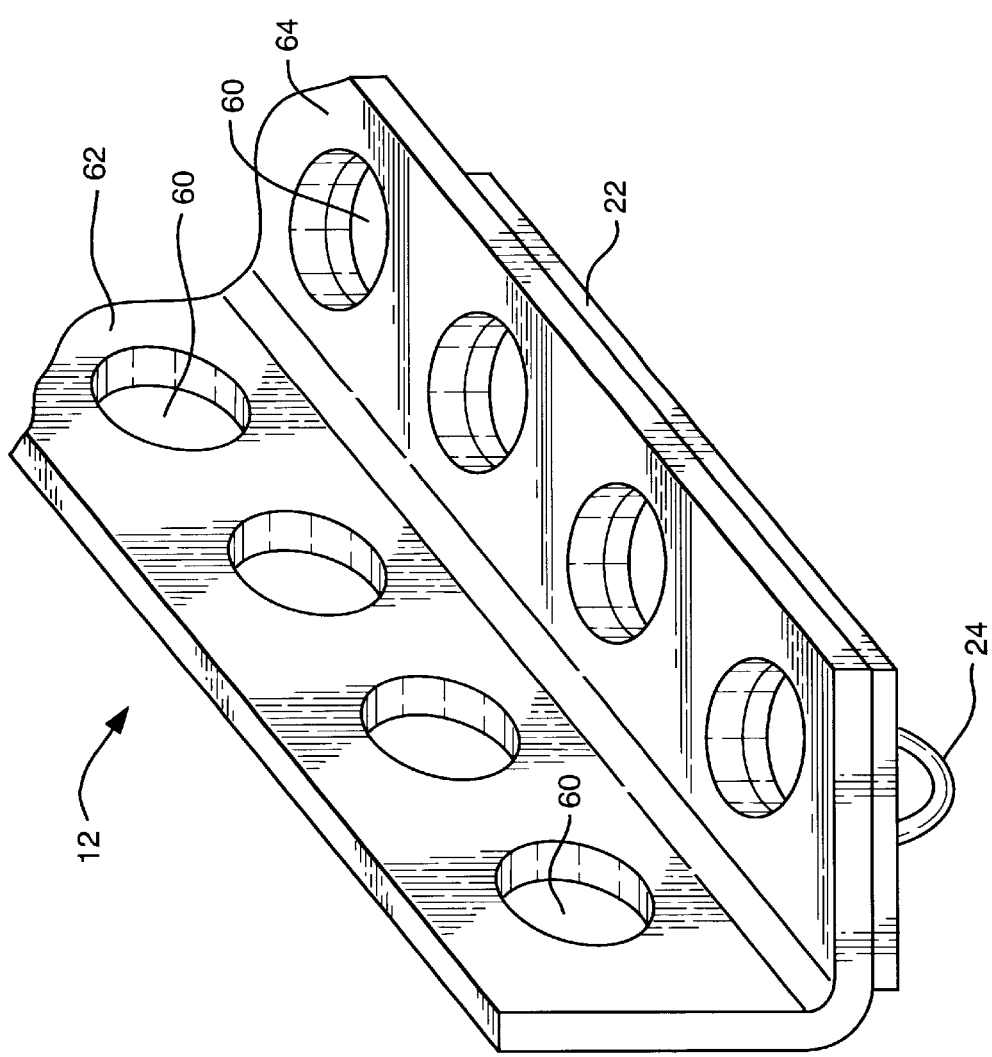
FIG. 1 is a perspective view of the L-shaped brace with the reinforced strap attachment means shown placed at one of the distal ends.
Figure 5:
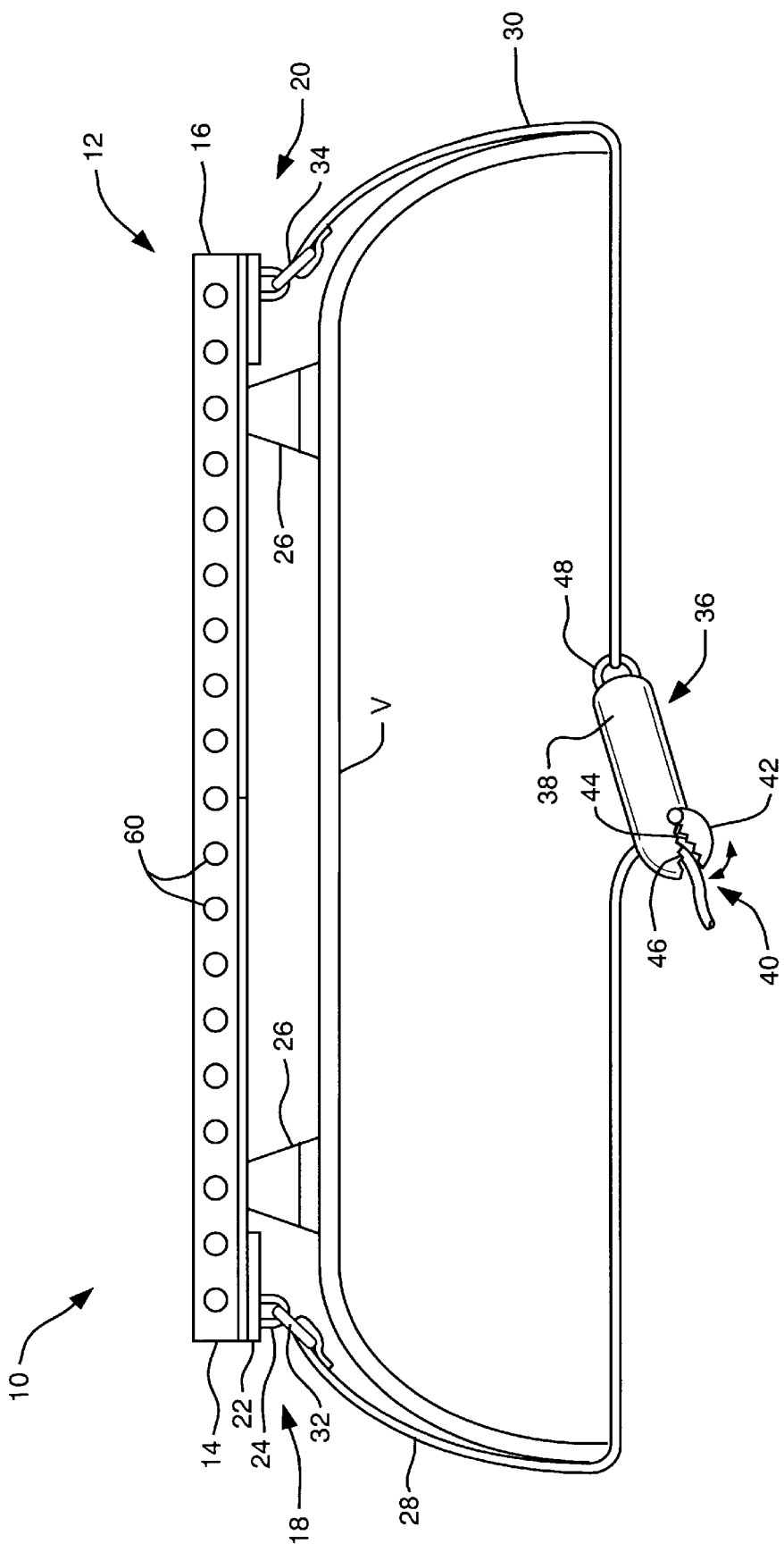
FIG. 5 is a rear view of a first embodiment of the present invention in place on the roof of a vehicle showing the disposition of the hard rubber feet, and the straps extending into the interior of the car and being secured with a cambuckle attachment.

Referring first to FIG. 5, the invention as indicated at 10 is seen placed on the roof of a vehicle. The L-shaped main bracket 12, shown in perspective in FIG. 1, is preferably made of metal, steel, iron, or the like, however it should be noted that a wide variety of composite or other type of material could be used without departing from the spirit of the invention. At the first distal end 14 and the second distal end 16 of the L-shaped main bracket 12 are the first and second reinforced strap engagement means 18 and 20, respectively. Each of the reinforced strap engagement means includes a flat reinforcement panel 22 and a generally U-shaped end point hook engager 24. As both the first and second reinforced strap engagement means 18, 20 are substantially identical; the same element numbers (22 and 24) are used in both cases. Flat reinforcement panel 22, in the preferred embodiment described herein, is welded to the L-shaped main bracket 12. Other attachment means, it should be understood, could be used. Various types of adhesives, for example, or a mechanical attachment such as screws, nuts and bolts, or the like could be used in place of the welding. In any event, the attached reinforcement panel serves to strengthen the main L-shaped bracket 12 at its ends where a fair amount of strain can be expected from both the load carried and the attachment of the straps, as will be discussed further below. In the embodiment described herein, the main L-shaped bracket 12 is rested in hard rubber feet 26. These rubber feet 26 are made of the well known type of hard rubber that will deform only slightly under great pressure and, at the same time, will not scratch or otherwise mar the finish of the vehicle (which is indicated generally at V in the Figure).

The discussion now turns to the preferred attachment of the straps to the invention 10 and, again, this feature is shown best in FIG. 5. The straps 28, 30 are made up of what is commonly referred to as "sling webbing" or "webbing". This is a flat, nylon, ribbon-like material. One end of each of the strap portions 28 and 30 terminates in a hook 32, 34. These hooks are used to engage one of the end point hook engagers 24. The straps 28 and 30, after they are attached to hook engagers 24, are led into the interior of the vehicle V and are connected one to the other in one of two ways. The first, seen in FIG. 5, is a cambuckle attachment 36. This is a known attachment art device wherein one strap portion 28 is led through the case 38 of the cambuckle at the opening indicated generally at 40. Biased engagement portion 42 is urged into contact with the strap 28 such that it is held between the biased engagement portion 42 corrugations 44 and the corrugations 46 integral with the cambuckle case 38. The cambuckle case 38 also includes cambuckle strap attachment 48 that lead to the second strap portion 30, terminating, at its end, in hook 34. Strap portion 28 is pulled through opening 40 until the engaged main L-shaped bracket 12 is firmly seated on the hard rubber feet 26. In the interests of safety this cambuckle arrangement should be checked, and if necessary, tightened further every so often during the transporting of the load (not shown).

Figure 6:
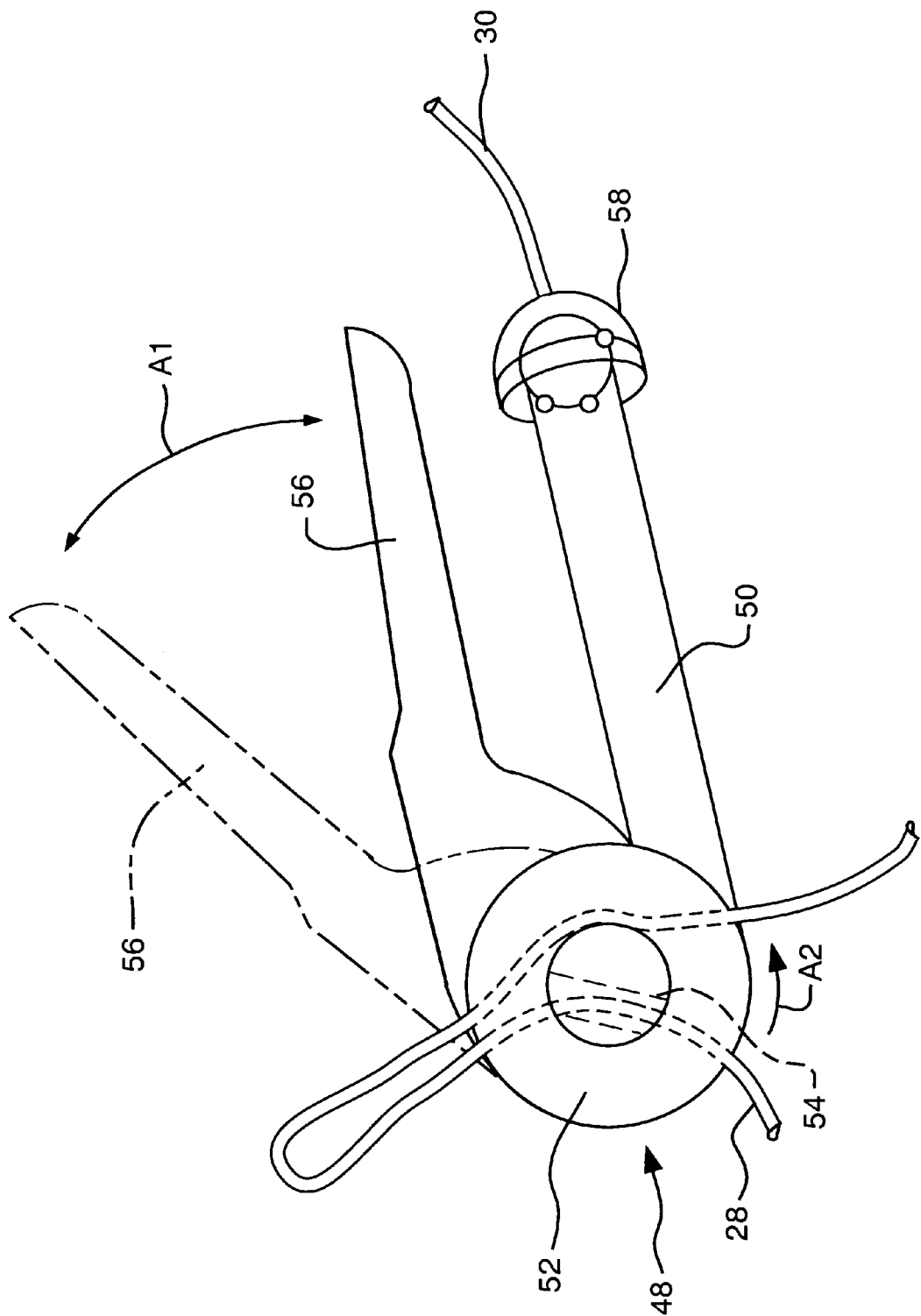
FIG. 6 is an expanded view as indicated at circle F6 in FIG. 5 showing the straps secured with a ratchet attachment.

Another embodiment of the invention, the strap portions 28, 30 may be engaged through a ratchet, seen in FIG. 6. Strap portion 28 is led through the opening, generally indicated at 48. Inside the case 50 of the ratchet is a cylindrical rotating portion 52 that includes a slot 54. The strap portion 28 is led through the slot 54 and as the engaging handle 56 is moved alternately as indicated by directional arrow A1, the cylindrical rotating portions is urged in a single direction such as is indicated by directional arrow A2. Thus, as is well known in the ratchet art, strap portion 28 is wound around cylindrical portion 52 and as the ratchet case 50 is attached to the second strap portion 30 through the ratchet strap attachment 58, the thus engaged main L-shaped bracket 12 is securely held against hard rubber feet 26 and, in turn, vehicle V.

Of great importance to the functioning of the present invention are the two sets of apertures, all designated at 60, on each of the perpendicular faces 62, 64 of the L-shaped bracket 12. This means that the two sets of apertures are disposed at a 90° angle to one another. This is of great importance as it allows for more latitude in the connection of the various utility attachments, as will be discussed further below.

Figure 2:
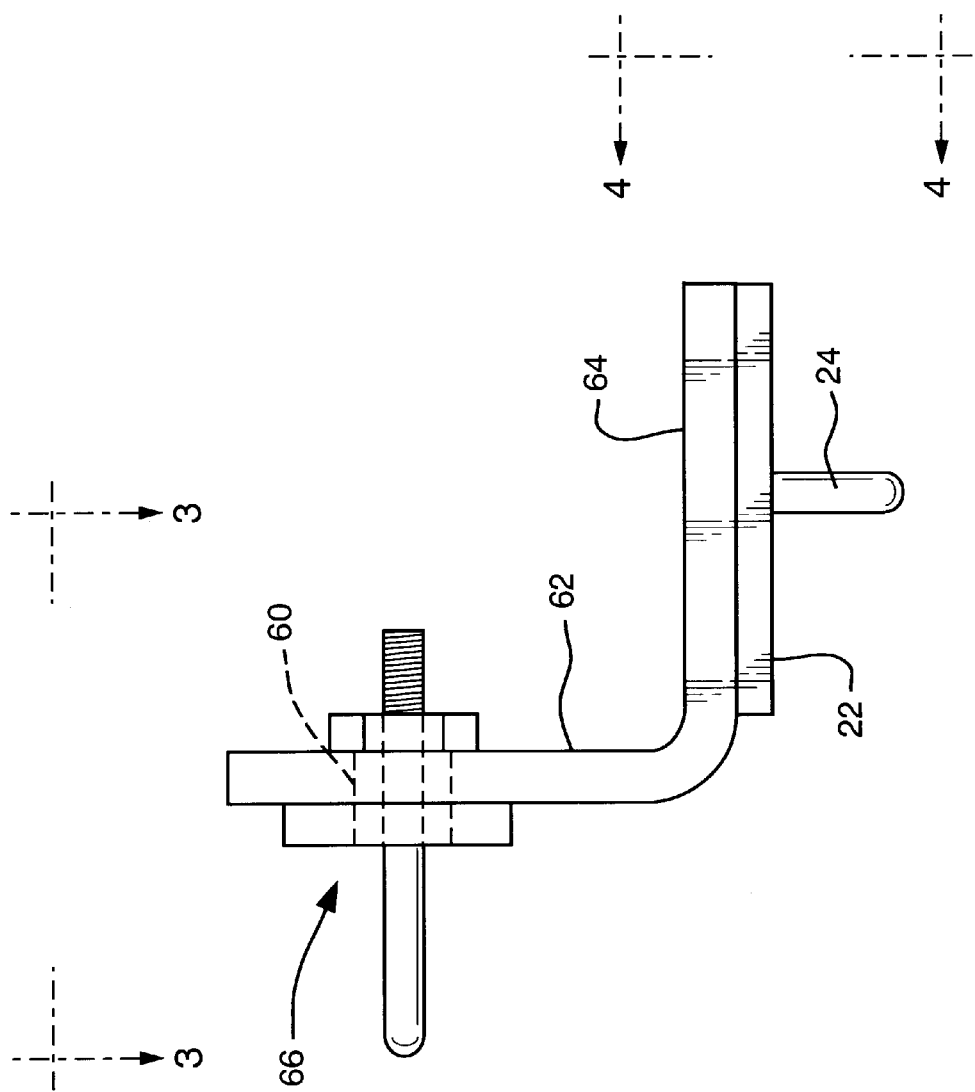
FIG. 2 is an end on view of an L-shaped brace showing both the reinforced strap engagement means and the removable large U-shaped bracket.
Figure 4:
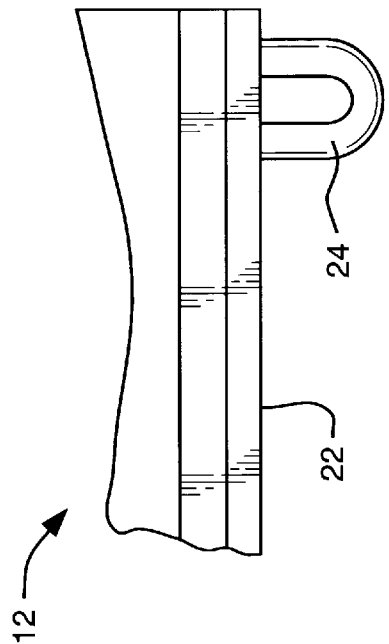
FIG. 4 is a view in the direction of line 4—4 in FIG. 2 showing the structure of the reinforced strap engagement means.
Figure 3:
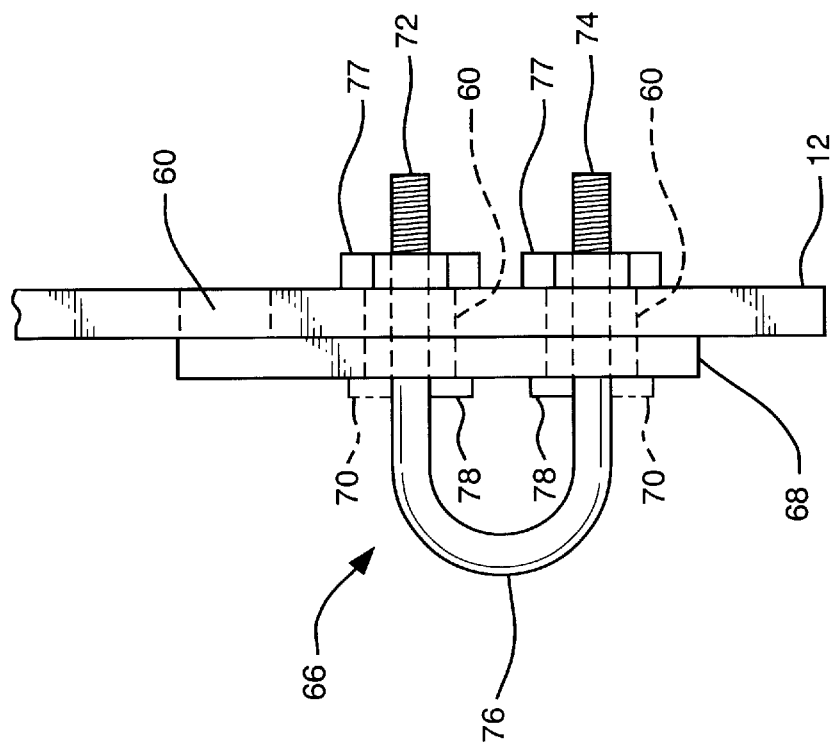
FIG. 3 is a view in the direction of line 3—3 in FIG. 2 showing the structure of the large U-shaped bracket.

Another feature connected with the main L-shaped bracket is the secondary load/hook attachment 66 seen in FIGS. 2 and 3. This attachment 66 comprises a plate 68 having a pair of apertures 70 therethrough. The apertures 70 are aligned with the apertures 60 on the main L-shaped bracket 12 and then the two legs 72, 74 of the secondary U-shaped connector 76 are inserted through the apertures 70, 60. The ends of the legs 72, 74 are threaded and this allows the user to secure the secondary U-shaped connector with nuts 77. If desired, stop plates 78 may be provided at the unthreaded base of the secondary U-shaped connector, as seen in FIG. 3. Though only one of the secondary load/hook attachments 66 is seen in the Figures, and that one at one of the distal ends of the main L-shaped bracket 12, it should be emphasized that any number of the secondary load/hook attachments 66 may be placed at any point along the main L-shaped bracket as the apertures 60 extend substantially all along its length on both of the perpendicular faces 62, 64.

It should be emphasized at this point that though "webbing" straps, hooks, ratchets and cambuckles are described above; any number of differing types of configurations could be used to secure the invention to the vehicle roof. A skilled practitioner would find many various combinations that would serve the same purpose without departing from the spirit of the invention.

Figure 7C:
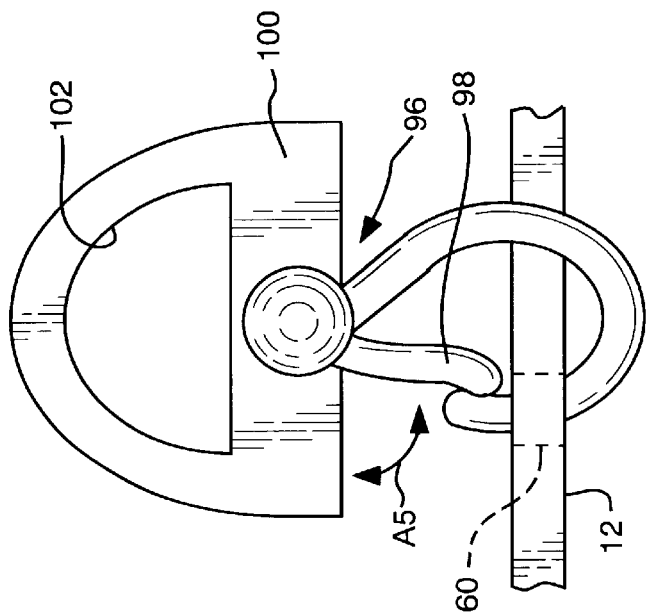
FIGS. 7A through 7D are views of the various utility attachment that allow elastic hook-ended bands to further secure the various objects to the roof or cab of the vehicle.

The discussion now turns to the utility attachments that are used in the further securing of the loads carried by the present invention. These are shown in FIGS. 7A–7D. All of these various utility attachments are meant to engage with one of the apertures 60 of the main L-shaped bracket 12. In FIG. 7A, the utility attachment is a C-shaped engagement portion 80 with a threaded stop 82. One of the legs of the C, indicated here at 84 is hooked through one of the apertures 60 and the threaded stop 82 is turned in a direction as indicated by directional arrow A3 and the threaded stop 82 is moved in the direction indicated at A4, thus closing the gap and securing the C-shaped engagement portion 80 to the main L-shaped bracket 12. The elastic cord E (discussed further below) with one of its terminal hooks may now be attached to the C-shaped engagement portion, as indicated generally at 86.

Figure 7B:
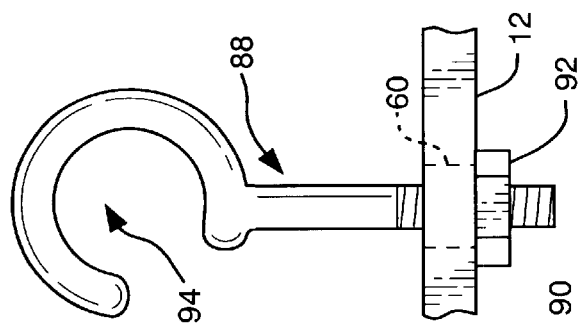
Figure 7A:
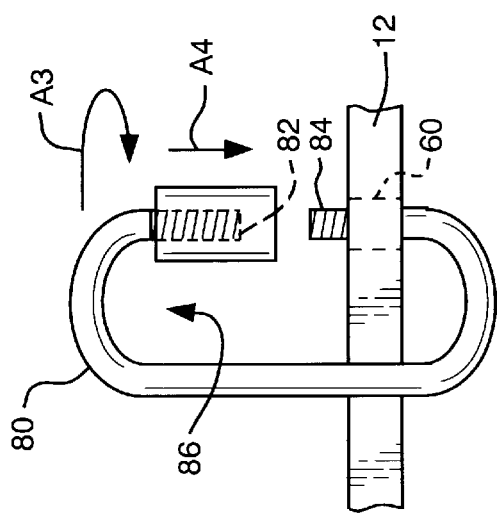

In FIG. 7B, the utility attachment is an extended hook 88. Hook 88 has a threaded end 90 which engages with a nut 92 to secure the extended hook 88 to the main L-shaped bracket 12, in a similar manner to that which is discussed above with the C-shaped engagement portion 80. Elastic cord E could then be attached at the area generally indicated at 94.

In FIG. 7C, the snap hook version 96 of the utility attachment is disclosed. This has a biased portion 98 that moves in the direction indicated by directional arrow A5. The biased portion 98 is normally held in a closed position, as is seen in the Figure. Snap hook 96 includes a body portion 100 that further includes an aperture 102. Elastic cord E may be attached through this aperture 102.

Figure 7D:
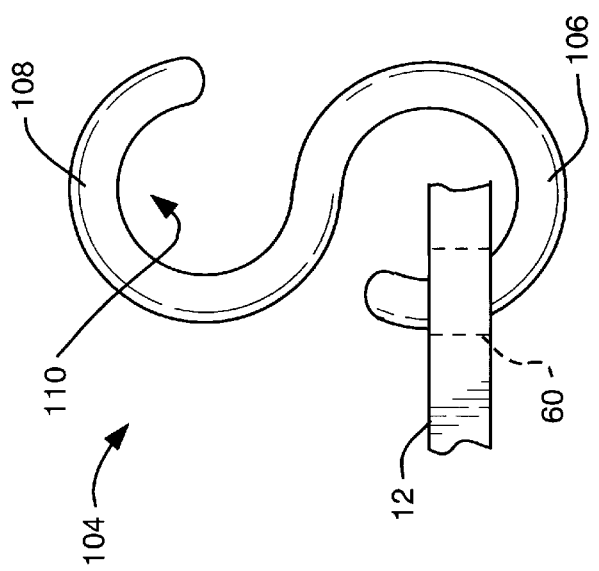

In FIG. 7D, an S-shaped utility attachment 104 is disclosed. This attachment has a first curved leg 106 and a second curved leg 108. Either one of these curved legs may be used to engage the main L-shaped bracket 12, as is seen in the Figure. The elastic cord E is then attached at the unengaged curved leg, as is indicated generally at 110 in the Figure.

Figure 8:
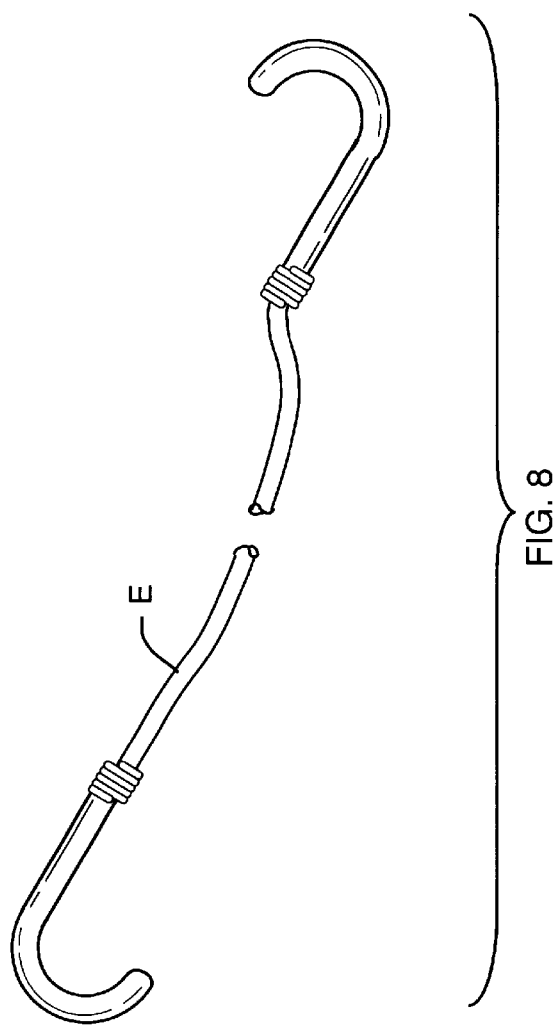
FIG. 8 is a view of one of the elastic hook-ended bands (also known as bungee cords).

Lastly, turning to FIG. 8, the elastic cord E is seen. This is a stretchable elastomeric material having a hook on both of its distal ends. These types of devices are commonly known as "bungee cords" and are commonly used to secure various s articles in a desired position. In the case of the instant invention, these cords enhance the ability of the user to secure an almost infinite variety of objects.

Figure 9:
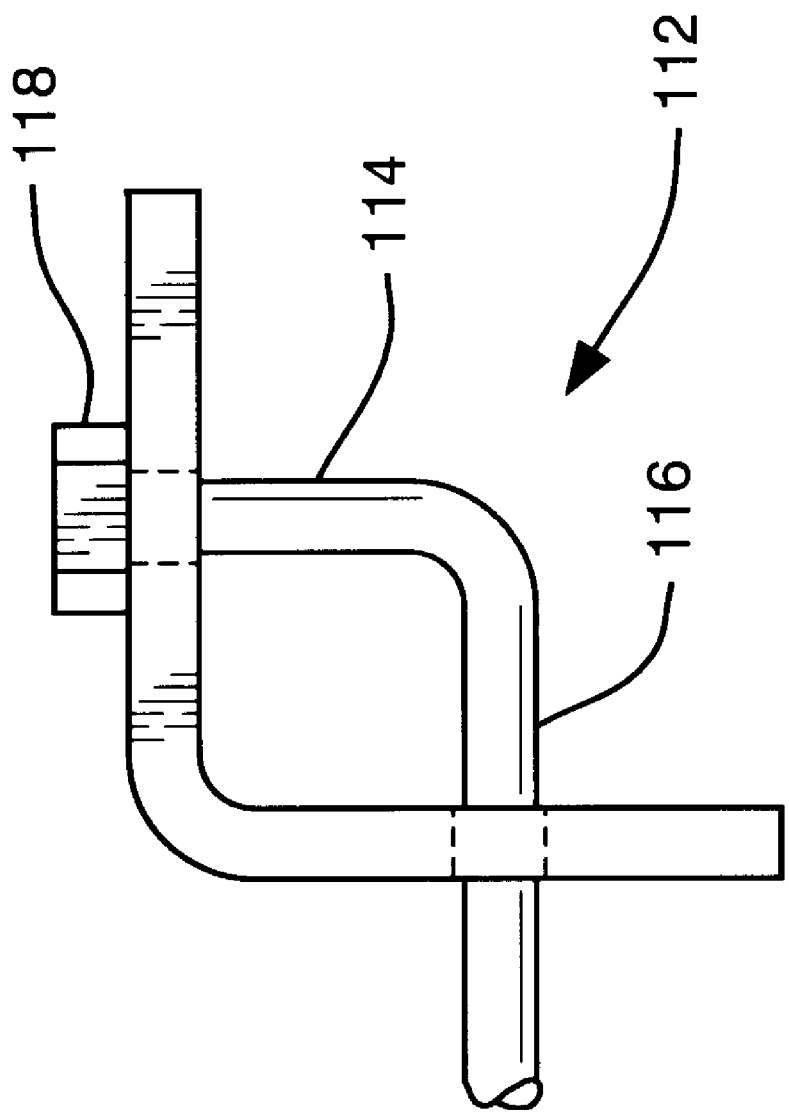
FIG. 9 is a view of an additional utility attachment that allows the user to hook the securing straps at any point along the length of the L-shaped bracket.

Turning to FIG. 9, an additional type of utility attachment is seen. This is generally indicated at 112 in the Figure and comprises another L-shaped utility having a first generally straight portion 114 and a second generally straight portion 116. First straight portion 114 is secured with a nut 118. Both the first and second straight portions 114, 116 of the utility attachment 112 pass through the apertures 60.

Figure 10:
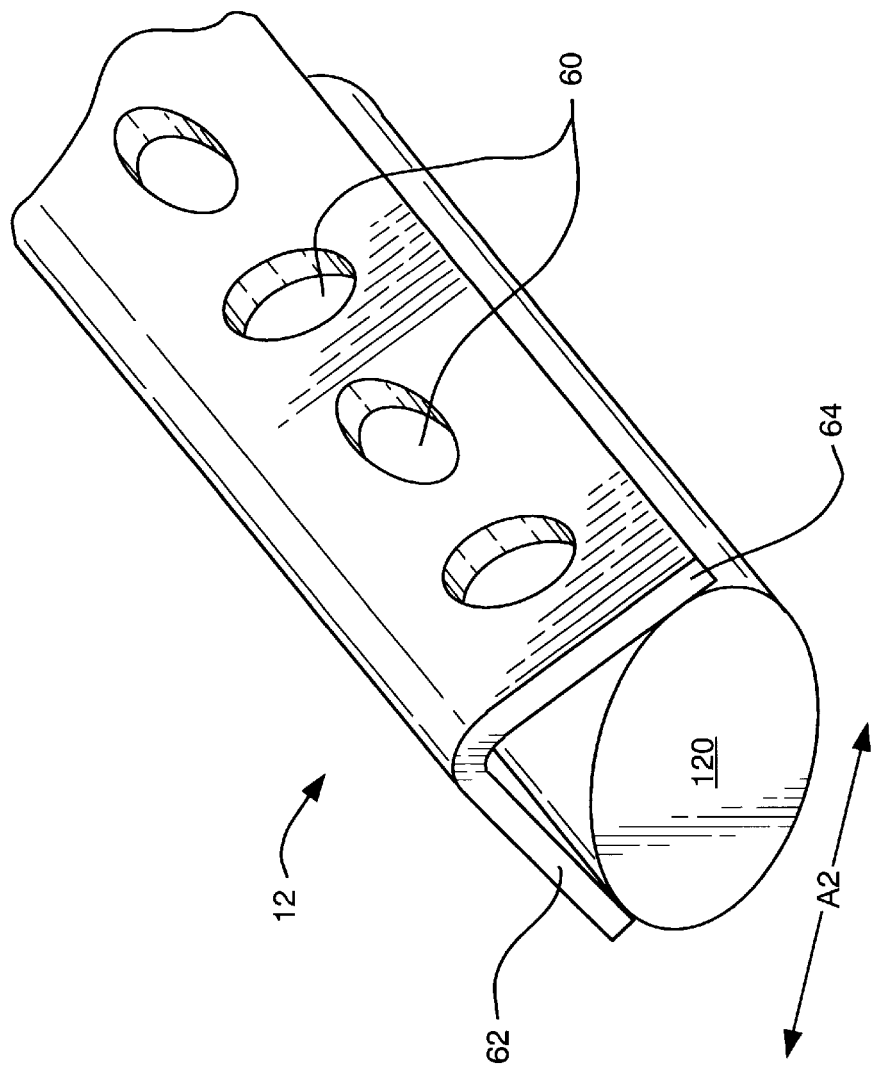
FIG. 10 is a perspective view of another embodiment of the instant invention wherein the L-shaped bracket is placed at a different angle in relation to the roof of the vehicle and where a rubber cylinder is used in place of the rubber cylindrical feet.

In FIG. 10, another embodiment of the invention is seen. In this embodiment, L-shaped main bracket 12 is turned at a different angle to the car roof such that the open space between perpendicular faces 62, 64 are pointed downward. The L-shaped brace rests on a cylindrical soft rubber foot 120. This arrangement allows for the L-shaped main bracket (s) to be rolled along the roof of the vehicle as indicated by directional arrow A2. Note also the alternating directions of the slotted apertures 60.

It should be emphasized that the instant invention is not in any way limited to the embodiments as they are described above but encompasses all embodiments as described in the scope of then following claims.

What is claimed as being new and desired to be protected by Letters Patent of the United States is as follows:

1. A removable tie-down utility brace for a vehicle comprising:
    an L-shaped main brace defining a first face and a second face, said first and said second faces being generally perpendicular to one another, said L-shaped main brace further including a first end and a second end, said first and said second end being distal from one another;
    a plurality of apertures located through both said first face and said second face such that a first set of apertures and a second set of apertures is defined;
    foot means adapted and configured to interpose between said L-shaped main bracket and the vehicle, said foot means being resiliently deformable such that the vehicle finish is not damaged when said foot means is brought into contact therewith;

strap portion engagement means located at both said first end and said second end of said L-shaped main bracket;

a first strap portion and a second strap portion adapted to be attached to said L-shaped main bracket at said first and said second end of said L-shaped main bracket at said strap portion engagement means, such that said first and said second strap portions may be passed through a passenger compartment of the vehicle and meet therein; and strap tightening means located on either said first strap portion or said second strap portion and engaging both with one another within the passenger compartment of the vehicle such that said L-shaped main bracket resting on said foot means is pulled into secure engagement with the vehicle.

2. The removable tie-down utility brace according to claim 1, wherein said foot means comprises at least two frusto-conical hard rubber feet disposed between said L-shaped main brace and the vehicle.

3. The removable tie-down utility according to claim 1, wherein said U-shaped end point hook engaging means serves as said strap portion engagement means.

4. The removable tie-down utility according to claim 1, further including a secondary load/hook attachment comprising a U-shaped connector adapted to be inserted through said apertures on said L-shaped main bracket, said secondary load/hook attachment further comprising a plate, said plate including secondary apertures therethrough, and where said secondary apertures are further aligned with said apertures on said L-shaped main brace and further where said U-shaped connector includes two legs each terminating in a threaded section such that said U-shaped connector is inserted through said apertures in said L-shaped main brace and is secured to said L-shaped main brace by threaded attachment means.

5. The removable tie-down utility according to claim 1, further including a secondary load/hook attachment comprising a U-shaped connector adapted to be inserted through said apertures on said L-shaped main bracket, said secondary load/hook attachment further comprising a plate, said plate including secondary apertures therethrough, and where said secondary apertures are further aligned with said apertures on said L-shaped main brace and further where said U-shaped connector includes two legs each terminating in a threaded section such that said U-shaped connector is inserted through said apertures in said L-shaped main brace and is secured to said L-shaped main brace by threaded attachment means.

6. The removable tie-down utility brace according to claim 1, wherein said first and said second end of said L-shaped main brace includes a flat reinforcement panel attached to one of either said first or said second face of said L-shaped main brace.

7. The removable tie-down utility brace according to claim 6, further including a U-shaped end point hook engaging means attached to each said flat reinforcement panel.

8. The removable tie-down utility brace according to claim 1, wherein said foot means comprises a cylindrical rubber foot disposed between said first face and said second face of said L-shaped main brace, said cylindrical rubber foot further disposed between said L-shaped main brace and the vehicle.

9. The removable tie-down utility according to claim 8, wherein first said strap portion and second said strap portion each have one end terminating in a hook, each of said hooks engaging one of said U-shaped end point hook engaging means.

10. The removable tie-down utility according to claim 1, wherein said strap tightening means comprises a cambuckle, said cambuckle comprising a case an opening in said case a biased engagement portion proximate said opening in said case corrugations located on said biased engagement portion and said case such that when one of said straps is passed through said opening in said case, said biased portion is moved into a first position that allows said strap to pass freely therethrough and then said biased portion, when released, moves into a second position that grasps said strap between said corrugations on said case and said corrugations on said biased portion to prevent said strap from inadvertently moving and thus securing said L-shaped main brace and said foot means into a fixed relationship with the vehicle.

11. The removable tie-down utility brace according to claim 10, wherein said foot means comprises a cylindrical rubber foot disposed between said first face and said second face of said L-shaped main brace, said cylindrical rubber foot further disposed between said L-shaped main brace and the vehicle.

12. The removable tie-down utility according to claim 10, wherein said U-shaped end point hook engaging means serves as said strap portion engagement means.

13. The removable tie-down utility brace according to claim 10, wherein said first and said second end of said L-shaped main brace includes a flat reinforcement panel attached to one of either said first or said second face of said L-shaped main brace.

14. The removable tie-down utility brace according to claim 13, further including a U-shaped end point hook engaging means attached to each said flat reinforcement panel.

15. The removable tie-down utility brace according to claim 10, wherein said foot means comprises at least two frusto-conical hard rubber feet disposed between said L-shaped main brace and the vehicle.

16. The removable tie-down utility according to claim 15, wherein first said strap portion and second said strap portion each have one end terminating in a hook, each of said hooks engaging one of said U-shaped end point hook engaging means.

17. The removable tie-down utility according to claim 1, wherein said strap tightening means comprises a ratchet, said ratchet comprising a cylindrical rotating strap engagement means further comprising a rotating slot for receiving one of said strap portions;

a movable engaging handle for rotating said cylindrical strap engagement means in a chosen direction such that one of said strap portions is inserted into said rotating slot and said movable engaging handle is manipulated to turn said cylindrical strap engagement means in said chosen direction thus securing said L-shaped main brace and said foot means into a fixed relationship with the vehicle.

18. The removable tie-down utility brace according to claim 17, wherein said foot means comprises at least two frusto-conical hard rubber feet disposed between said L-shaped main brace and the vehicle.

19. The removable tie-down utility brace according to claim 17, wherein said foot means comprises a cylindrical rubber foot disposed between said first face and said second face of said L-shaped main brace, said cylindrical rubber foot further disposed between said L-shaped main brace and the vehicle.

20. The removable tie-down utility brace according to claim 17, wherein said first and said second end of said L-shaped main brace includes a flat reinforcement panel attached to one of either said first or said second face of said L-shaped main brace.

21. The removable tie-down utility brace according to claim 20, further including a U-shaped end point hook engaging means attached to each said flat reinforcement panel.

22. The removable tie-down utility according to claim 17, wherein said U-shaped end point hook engaging means serves as said strap portion engagement means.

23. The removable tie-down utility according to claim 22, wherein first said strap portion and second said strap portion each have one end terminating in a hook, each of said hooks engaging one of said U-shaped end point hook engaging means.

* * * * *